US010853783B1

(12) United States Patent
Maeng (10) Patent No.: US 10,853,783 B1
(45) Date of Patent: Dec. 1, 2020

(54) PROCESSING ONLINE TRANSACTIONS WITH AN INTERMEDIARY SYSTEM

(71) Applicant: Wells Fargo Bank, N.A., San Francisco, CA (US)

(72) Inventor: Joon Maeng, Newcastle, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 803 days.

(21) Appl. No.: 14/984,452

(22) Filed: Dec. 30, 2015

(51) Int. Cl.
| G06Q 20/20 | (2012.01) |
| G06Q 20/36 | (2012.01) |
| G06Q 20/32 | (2012.01) |
| G06Q 20/40 | (2012.01) |
| G06Q 20/42 | (2012.01) |

(52) U.S. Cl.
CPC ....... *G06Q 20/204* (2013.01); *G06Q 20/3224* (2013.01); *G06Q 20/363* (2013.01); *G06Q 20/4014* (2013.01); *G06Q 20/42* (2013.01)

(58) Field of Classification Search
CPC ............. G06Q 20/204; G06Q 20/3224; G06Q 20/363; G06Q 20/4014; G06Q 20/42
USPC .......................................................... 705/17
See application file for complete search history.

(56) References Cited

U.S. PATENT DOCUMENTS

| 5,375,251 | A | 12/1994 | Pfundstein |
| 6,944,447 | B2 | 9/2005 | Portman et al. |
| 7,502,761 | B2 * | 3/2009 | Siegal ..................... G06F 21/32 |
| | | | 705/67 |
| 8,321,285 | B1 * | 11/2012 | Hurst ..................... G06Q 40/02 |
| | | | 705/21 |
| 8,352,323 | B2 | 1/2013 | Fisher |
| 8,589,237 | B2 | 11/2013 | Fisher |
| 8,831,637 | B2 | 9/2014 | Stopel et al. |
| 2002/0077993 | A1 | 6/2002 | Immonen et al. |
| 2002/0179704 | A1 | 12/2002 | Deaton |
| 2005/0076369 | A1 | 4/2005 | Cai et al. |
| 2007/0265984 | A1 | 11/2007 | Santhana |

(Continued)

FOREIGN PATENT DOCUMENTS

| WO | WO-2012083113 A3 | 6/2012 |
| WO | WO-2014084484 A1 | 6/2014 |
| WO | WO-2014122453 A2 | 8/2014 |

OTHER PUBLICATIONS

"Contactless Mobile Payment Application Activation User Interface Overview, Usage Guidelines, and PPSE Requirements,", EMVCo, Version 1.0, (Dec. 2010), 120 pgs.

(Continued)

*Primary Examiner* — A. Hunter Wilder
*Assistant Examiner* — Joseph M Mutschler
(74) *Attorney, Agent, or Firm* — Schwegman Lundberg & Woessner, P.A.

(57) ABSTRACT

A method may comprise: receiving, from a merchant server, an application programming interface (API) call including an authorization request for payment and a mobile wallet identification; querying a database with the mobile wallet identification to determine a logical location of a mobile wallet associated with the mobile wallet identification; transmitting, based on the determination, a request for a payment source for the payment to the mobile wallet; receiving, from the mobile wallet, an identification of a payment source; and forwarding the identification of the payment source to the merchant server.

15 Claims, 5 Drawing Sheets

(56) References Cited

U.S. PATENT DOCUMENTS

| | | | |
|---|---|---|---|
| 2008/0051059 A1 | 2/2008 | Fisher | |
| 2010/0125510 A1* | 5/2010 | Smith | G06Q 20/105 |
| | | | 705/17 |
| 2011/0180598 A1* | 7/2011 | Morgan | G06Q 20/02 |
| | | | 235/380 |
| 2012/0089425 A1 | 4/2012 | Borucki | |
| 2012/0166333 A1 | 6/2012 | von Behren et al. | |
| 2013/0013499 A1 | 1/2013 | Kalgi | |
| 2013/0097041 A1 | 4/2013 | Fisher | |
| 2013/0103478 A1 | 4/2013 | Fisher | |
| 2013/0103511 A1 | 4/2013 | Fisher | |
| 2013/0103512 A1 | 4/2013 | Fisher | |
| 2013/0103513 A1 | 4/2013 | Fisher | |
| 2013/0103514 A1 | 4/2013 | Fisher | |
| 2013/0144702 A1* | 6/2013 | Tabor | G06Q 30/02 |
| | | | 705/14.26 |
| 2013/0191227 A1* | 7/2013 | Pasa | G06Q 20/3674 |
| | | | 705/14.73 |
| 2013/0332337 A1 | 12/2013 | Tran | |
| 2014/0089120 A1 | 3/2014 | Desai et al. | |
| 2014/0129438 A1 | 5/2014 | Desai et al. | |
| 2014/0249999 A1* | 9/2014 | Johnson | G06Q 20/027 |
| | | | 705/39 |
| 2014/0250005 A1* | 9/2014 | Amacker | G06Q 20/36 |
| | | | 705/41 |
| 2014/0279106 A1 | 9/2014 | Smelcer | |
| 2014/0279403 A1 | 9/2014 | Baird et al. | |
| 2015/0045068 A1 | 2/2015 | Soffer | |

OTHER PUBLICATIONS

"Wallet-POS Specification", GSM Association, Version 1.0, (May 2013), 32 pgs.

Pourghomi, Pardis, et al., "A Secure Cloud-Based Nfc Mobile Payment Protocol", vol. 15, (Nov. 2014), 8 pgs.

* cited by examiner

PROCESSING ONLINE TRANSACTIONS WITH AN INTERMEDIARY SYSTEM

TECHNICAL FIELD

Embodiments described herein generally relate to processing transactions and, in particular but without limitation, to processing online transactions with an intermediary system.

BACKGROUND

Mobile or digital wallets can allow consumers to make contactless payments for products and services with mobile devices such as phones or watches instead of cash, credit cards or checks. Using an antenna in the mobile device, mobile wallets can communicate with contactless readers using radio frequency identification (RFID). They can allow consumers to make secure payments in a relatively quick manner by placing their mobile devices near contactless readers at stores.

BRIEF DESCRIPTION OF THE DRAWINGS in the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

A mobile wallet can be used to make payments in a variety of ways including, as examples, at a contactless terminal (e.g., point-of-sale (POS) card readers) and through native applications operating on a mobile device. To make a payment at a merchant's store, for example, a user can select a wallet item (e.g., credit card item) of the mobile wallet for the transaction and place the mobile device near the contactless terminal. The mobile device can then wirelessly transfer unique account information (e.g., token and cryptograph) for the credit card to the contactless terminal using near field communication (NFC) or magnetic secure transmission (MST), for example. However, online stores do not have POS terminals to receive the unique account information or easy access to the mobile wallet using Operating System API calls like native application, potentially limiting the use of mobile wallets.

Figure 1:
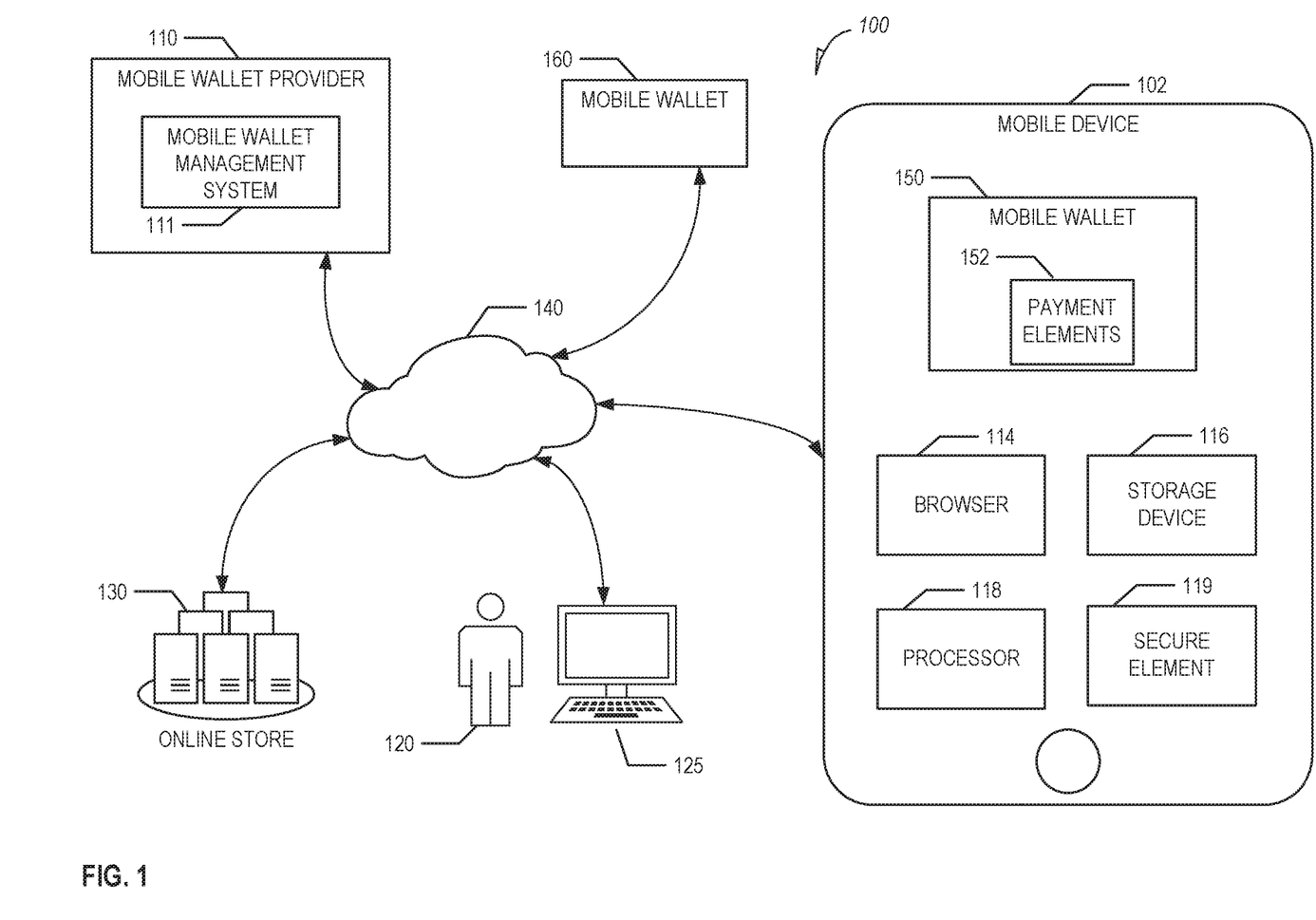
FIG. 1 illustrates an example environment for mobile wallet transactions, according to various examples.

FIG. 1 illustrates an example environment 100 for mobile wallet transactions. The environment 100 includes mobile wallet provider 110, mobile wallet management system 111, mobile wallet 160, online store 130, user 120, computing device 125, and mobile device 102 which includes mobile wallet 150, payment elements 152, browser 114, storage device 116, processor 118, and secure element 119.

The various components illustrated in environment 100 may communicate via network 140. The network 140 may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Direct), or other combinations or permutations of network protocols and network types. The network 140 may include a single local area network (LAN) or wide-area network (WAN), or combinations of LAN's or WAN's, such as the Internet The mobile wallet 150 operates (e.g., executed by processor 118) on a mobile device 102 such as a smart phone or smart watch. The mobile wallet can include one or more wallet items such as, for example, payment elements 152 (e.g., credit cards, debit cards, gift cards), identification cards (e.g., driver's licenses, student ID's, passports), bank accounts (e.g., checking accounts, saving accounts), insurance cards (e.g., health insurance cards, auto insurance cards), promotional cards (e.g., coupons, discount cards) and other items (e.g., tickets, boarding passes, membership cards, contact cards).

For each wallet item, the mobile device 102 can store unique information. For a credit card, for example, the unique account information can be a unique token or cryptograph hash typically provided by the card network and/or card-issuing bank. In another example, the unique account information for a credit card can be the credit card number and the account holder's name. The unique information may be stored in secure element 119. The secure element 119 may be a tamper proof device that provides for secure storage and an execution environment for sensitive data and processing. The secure element 119 can be implemented in a different form factors such as Universal Integrated Circuit Card (UICC), embedded secure element, and microSD. Some mobile wallets provide unique account information by other methods such as Host Card Emulation (HCE).

A user may add one or more mobile wallet payment elements via an interface of mobile wallet 150. For example, a user may use a camera sensor of the mobile device 102 to take a picture of a credit card. The mobile wallet 150 may perform optical character recognition to obtain the credit card number and card holder's name. The mobile device 102 may transmit a request to an issuer of the credit card to determine if the credit card number is valid and matches the card holder's name. A user may also add mobile wallet elements via a website or other interface served from mobile wallet provider 110. The mobile wallet provider 110 may in turn transmit data identifying the added mobile wallet elements to mobile device 102 to update mobile wallet 108.

The example environment 100 can further include a mobile wallet provider 110 and a financial intuition (not shown, such as a bank or credit card company, for example). The mobile wallet provider 110 can, for example, interface with the mobile wallets 150 and 160 and online store 130 to facilitate purchase of goods or services of the online store 130 using a mobile wallet. The mobile wallet provider 110 can be a card issuer or bank or can be a service provider, separate from those systems, for example. Example mobile wallet providers include Apple, Google, Samsung, Starbucks and Visa. The mobile wallet provider 110 can, for example, include a mobile wallet management system 111 that manages interactions between a mobile wallet and the online store 130.

The mobile wallet management system 111 may include a database of mobile wallets issued by mobile wallet provider 110. An entry in the database may include an identifier of a mobile wallet, a location of the mobile wallet, an owner of the mobile wallet, items in the mobile wallet, and balances of the items in the mobile wallet. The identifier may be a unique identifier that is generated when the mobile wallet is installed, for example, on a mobile device. The location information may include be a logical location such an IP address, telephone number, mobile device identifier, or an e-mail associated with the mobile device such that communication may be established with the mobile wallet.

The mobile wallet management system 111 may also publish an Application Programming Interface (API) for use by online stores. The API may include one or more calls to receive information from an online store. One of the calls may allow an online store to submit an invoice with a mobile wallet identification. The API may be a representational state transfer (RESTful) API and use JavaScript Object Notation or XML.

Figure 2:
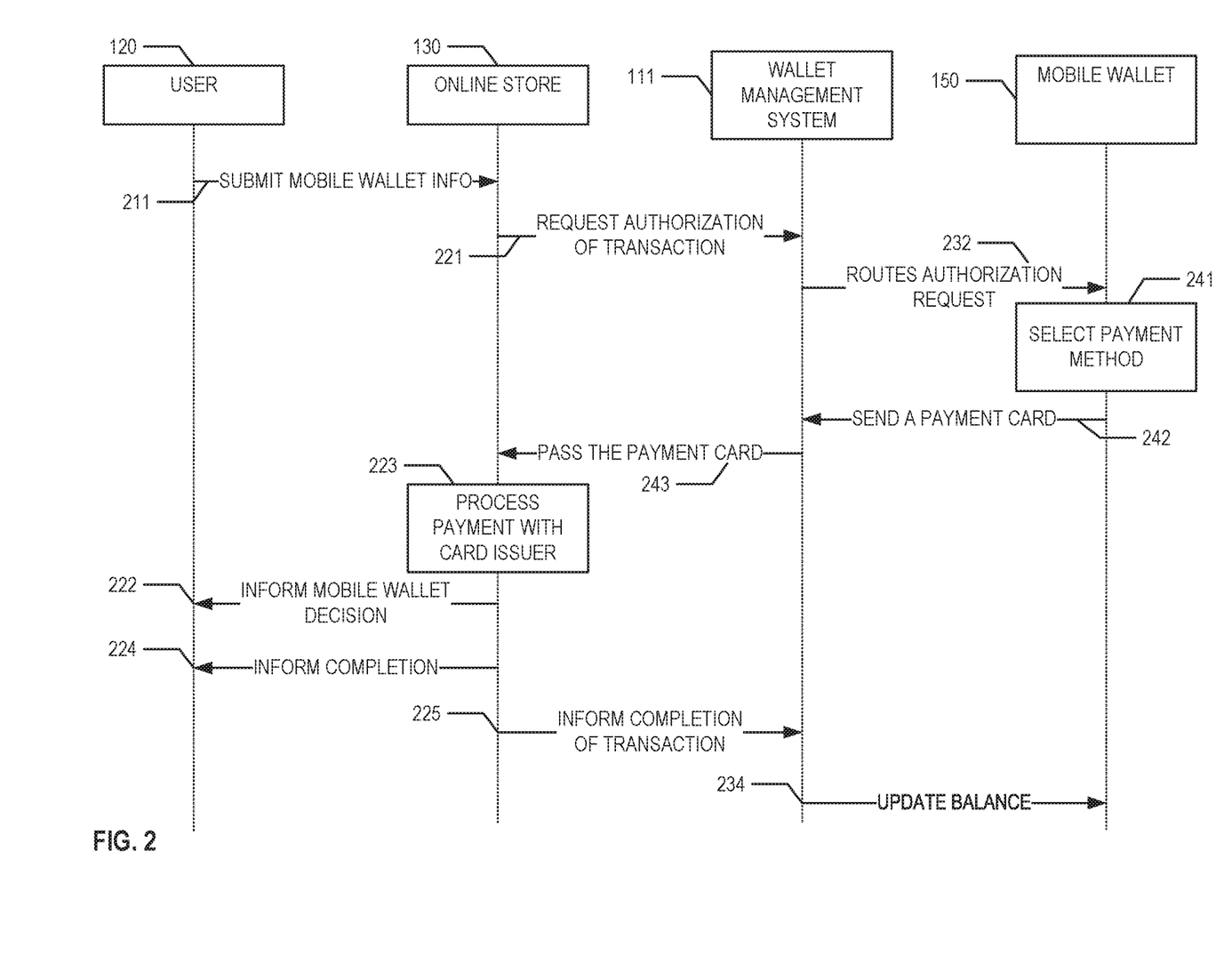
FIG. 2 illustrates an exemplary flow diagram of using a mobile wallet for online shopping; according to various examples.

In various examples, the user 120 is associated with mobile wallet 150, but not mobile wallet 160. The user may own mobile device 102 on which mobile wallet 150 is resident, and mobile wallet 160 may be a mobile wallet of the user's employer or another entity. The user 120 may interact with online store 130 using a device separate from the mobile device 102 such as computing device 125. The user 120 may also interact with online store 130 using browser 114. The interaction may include the user entering in a Uniform Resource Locator (URL) for the online store 130 into a browser. The online store 130 may include one or more merchant servers to respond to requests from the user as well as communicate with mobile wallet provider 110, FIG. 2 illustrates an exemplary flow diagram of using a mobile wallet for online shopping. At the online store 130, the user may select one or more items to purchase and proceed to a checkout page provided by online store 130. The checkout page may include an input user interface element to receive an identification of a mobile wallet and drop-down user interface element to select a mobile wallet provider. The user may enter in the identification of a mobile wallet (211). The mobile wallet does not need to belong to the user. For example, the user may be a child and the user may enter in the identity of his/her parent's mobile wallet. The identification may be a phone number, a unique identifier, etc. The user may also select the provider of the mobile wallet entered. Other types of user interface elements may be used without departing from the scope of this disclosure.

In some examples, the user enters in a web accessible address of the mobile wallet provider. If a web accessible address is not entered, the online store 130 may access a database of mobile wallet providers to retrieve the web accessible address associated with the selected provider.

In various example, the user is registered at the online store. During registration the user may enter in one or more mobile wallet identifiers and associated providers. The checkout page may list the entered mobile wallets for selection. At operation 221, online store 130 may request authorization of the transaction (e.g., the purchase of the user selected items) from mobile wallet management system 111. The authorization may be transmitted to the web accessible address retrieved above. The authorization may be in the form of an API call and include a unique ID of the mobile wallet as entered by the user, transaction information (e.g., invoice, amount), an online store identifier, and the user's contact information. The communication between the online store and the wallet management system may be encrypted.

In response, the mobile wallet management system 111 may query its database to determine the location of the mobile wallet (e.g. logical address such as IP address) associated with the received mobile wallet identifier. At operation 232, the transaction information may be transmitted to the determined mobile wallet in this case, the mobile wallet 150. Additional information beyond the transaction information may also be transmitted such as advertisement and promotional items received from the online store 130 or retrieved from its own database. The management system may collect data and perform analytics with customers' transactional data and provide additional information based on them. Additional data may include user rating on the merchant or product and other.

A notification of the transaction may be received at a device that houses the mobile wallet 150. For illustration purposes the reviewing user of mobile wallet 150 is the same user who initiated the transaction, but as discussed above, the users may differ. The notification may be a push notification. In response to the notification, the user may open the mobile wallet 150 to review the transaction details and selects a payment source (e.g., one of the items in payment elements 152) at operation 241 if the transaction details are acceptable. In some examples, the user of the mobile wallet 150 may be authenticated (e.g., using a fingerprint scanner on the mobile device) before selecting a payment source.

At operation 242, the payment card selected at operation 241 is transmitted to mobile wallet management system 111. The transmitted information with the payment card may include unique account information (e.g., token and cryptograph) for the selected card. In other words, the information transmitted can be the same information that is transmitted during a payment with mobile wallet 150 at a contactless terminal. At operation 243, the payment card information is passed back to online store 130 according to the information received from the online store 130 at operation 221. If a reviewing user rejects the invoice, the online store 130 may inform the decision to the ordering user in operation 222. This may occur when the user approving the transaction is a different user than submitted the transaction.

When the user is different from the mobile wallet owner, the authorization may take time and the online store may cancel the authorization request if it does not receive an authorization in a predetermined duration and inform it to the user. In one embodiment, the mgmt. system may use an alternative mobile wallet based on the database where one or more mobile wallets may be specified as a proxy for the mobile wallet 150 specified by the user 120 in case the mobile device with mobile wallet 150 cannot be reached due to it being offline or other reasons.

Assuming a payment card was received, the online store 130 may process the payment with issuer of the payment card at operation 223. If the payment was approved, the online store 130 may present a notification to the ordering user at operation 224 and ship any purchased products. The online store 130 may also inform mobile wallet management system 111 of the completion of the transaction at operation 225. In some examples, the order of operations 224 and 225 may be reversed. The mobile wallet management system 111 may also update a balance of the used payment card. In some examples, the mobile wallet management system 111 may act as the payment processor on behalf of the online store 130. The mobile wallet management system 111 may also collect e-commerce data and perform analytics for the online store 130.

As mentioned, the entered mobile wallet may not belong to the ordering user, or the ordering user may not have a mobile wallet. For instance, the shopper may be a minor who selects items to purchase and submits a mobile wallet ID of her mother. Her mother may examine the invoice, edit it, and submits a payment card for her with her mobile wallet. The ordering user may be an employee of a company. She may purchase a work related product and submit the company mobile wallet ID. The payment department may review the items and sends a payment card from the company mobile wallet. Accordingly, the mobile wallets are not restricted to mobile device and may reside on other computing devices such as desktop computers.

Figure 3:
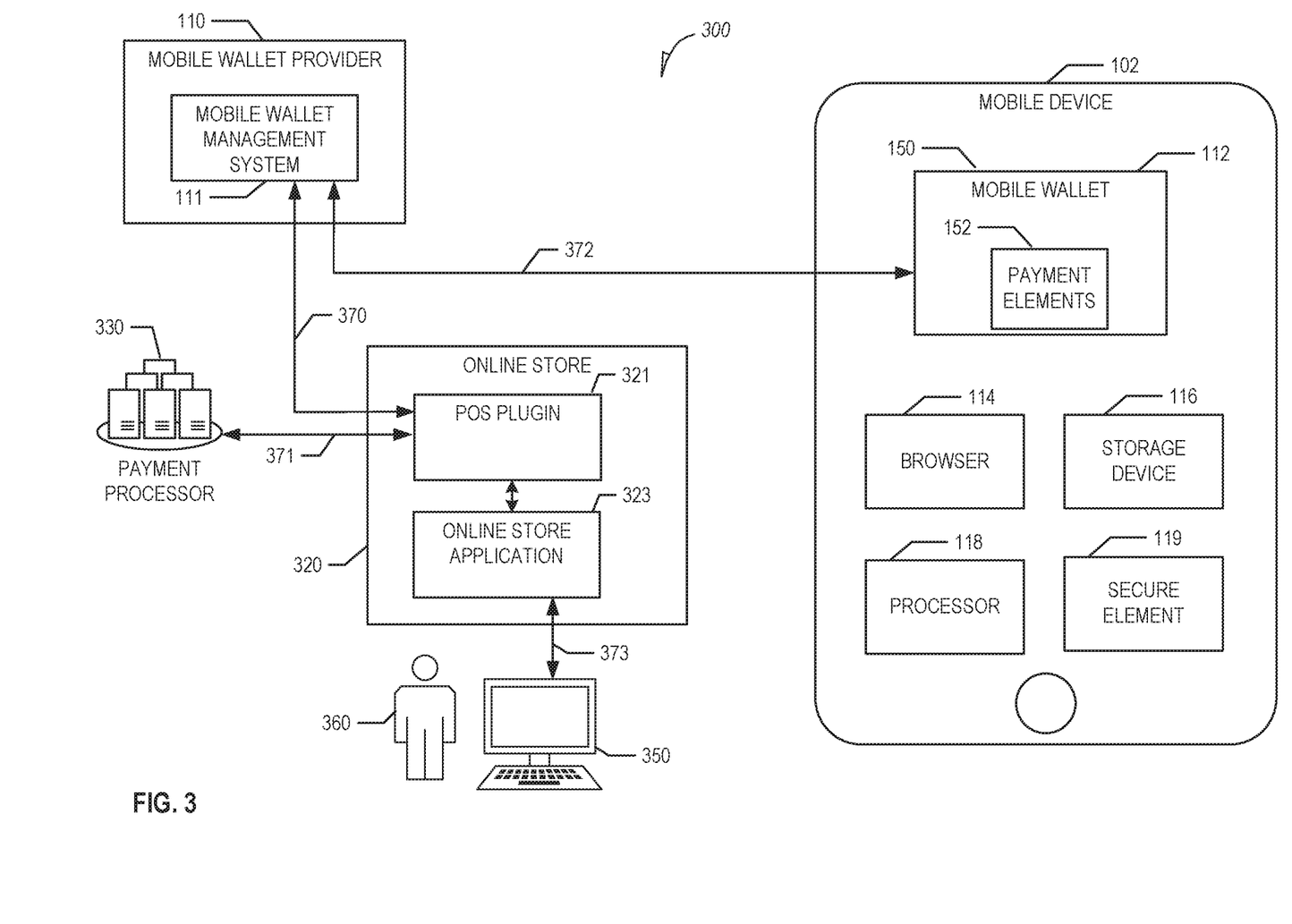
FIG. 3 illustrates an example environment for mobile wallet transactions, according to various examples.

FIG. 3 illustrates an example environment 300 for mobile wallet transactions. The environment 300 includes mobile wallet provider 110, mobile wallet management system 111, and mobile device 102, which includes mobile wallet 150, payment elements 152, browser 114, storage device 116, processor 118, and secure element 119. A more detailed description of these components may be found in the discussion of FIG. 1, above. The environment also includes online store 320, point-of-sale plugin 321, online store application 323, user 360, computing device 350, payment processor 330, and connections 370-373.

The online store 320 may use an online store application 323 to allow shoppers such as user 360 to visit the online store with a web browser of a computing device 350 such as personal computer, laptop, tablet, and smartphone. The online store application 323 may be presented as web pages served via merchant servers of the online store 320 via the Internet. The POS plugin 321 may be an interface (e.g., an API or web interface) for taking orders using the online store 320.

The payment processing entity 330 may be a representative term to indicate different types of payment authorization groups. For instance, the payment processing entity for credit card payments may include process/acquirer, credit card company, and card issuers. The payment processing entity for checks may be banks and/or Automatic Clearing House (ACH).

The user 360 may use her computing device 350 to select products or services to purchase at the online store 320. At the checkout in the online web store, the user 360 may submit her mobile wallet provider 110 identification and mobile wallet 150 identification, which may be a unique name or number.

The online store 320 may contact (e.g. using an API call or other electronic request) the mobile wallet provider 110 to establish a communication path 370 between POS plugin 321 and the mobile wallet mgmt. system 111. The online store 320 may also transmit the mobile wallet ID to mobile wallet management system 111 submitted by the user 160 at the checkout. The mobile wallet system 111 may contact the mobile wallet 150 based on the mobile wallet ID and establish a connection 172.

The user 360 may review the invoice from the online store via the website and selects a payment method (e.g., a credit card) from the mobile wallet 150. The mobile wallet may retrieve the unique account information associated with the payment method from the secure element 119 and send it to the PUS plugin 321 via the wallet management system 111. The information sent to the PUS plugin may be the same information that would be sent to a physical PUS terminal. The mobile wallet management system 111 may simply pass the data securely between the POS plugin 321 and the mobile wallet 150 (e.g., in real-time). In other embodiments, the mobile wallet management system may collect data and provide other services such as offering coupons for the purchased product for the user 360 or the mobile wallet 150.

When the POS plugin 321 receives the payment method, the online store may contact the payment processing entity 330 to get an authorization on the payment. When the online store 320 gets the authorization, it may notify the user 360 via the mobile wallet mobile wallet 150 (e.g., using the communication line set up by wallet management system 111) and/or the online application 323 In one embodiment, the mgmt. system 111 may facilitate direct communication (e.g., chat) between the user 360 and the mobile wallet 150 so that the user (i.e., buyer) 360 at the online store 320 and the mobile wallet 150 owner can chat and/or edit items to purchase.

Figure 4:
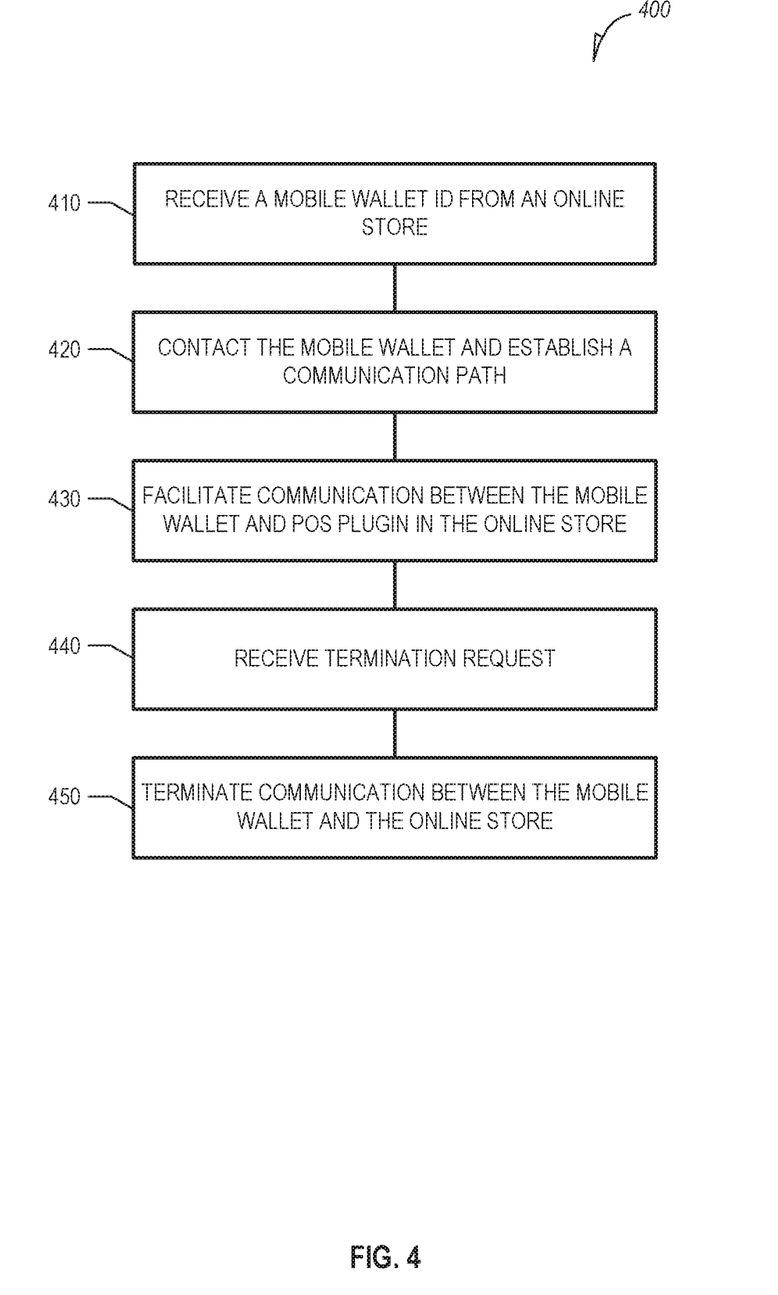
FIG. 4 illustrates a flowchart of a method of using a mobile wallet for online shopping, according to various examples.

FIG. 4 is a flowchart of a method of using a mobile wallet for online shopping, according to an example embodiment. The mobile wallet management system may receive a unique ID of the mobile wallet from the online store in operation 410. The mobile wallet management system may contact the mobile wallet (e.g., transmit a request to a mobile device associated with the mobile wallet) to establish a communication path.

The mobile wallet management system may establish a communication path in operation 430 to facilitate communication between the mobile wallet and the POS plugin in the online store. To facilitate information transfer between the POS plugin and the mobile wallet, the POS plugin may include a common identifier in each communication to the mobile wallet management system for a given transaction. The common identifier may be passed to the mobile wallet as well, and communications from the mobile wallet to the mobile wallet management system may include the common identifier. In this manner, the mobile wallet management system may correctly route messages between the POS plugin and the mobile wallet. The communication path may also be encrypted.

The mobile wallet management system may have multiple communication pathways established at a time among many mobile wallets and POS plugins. A database or table may be stored at mobile wallet management system of active communication pathways. An entry in the table may include the common identifier, a location (e.g., IP address) of the POS plugin, and a location (e.g., phone number) of the mobile wallet. When information is received from either the POS plugin or mobile wallet, the table may be queried using the common identifier to determine where to route the information.

The mobile wallet management system may receive a termination request when the transaction is complete from the store or the mobile wallet in operation 440. The mobile wallet management system terminates communication between the POS plugin and mobile wallet at operation 450. Termination may include removing the communication pathway from the table discussed above.

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only, memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
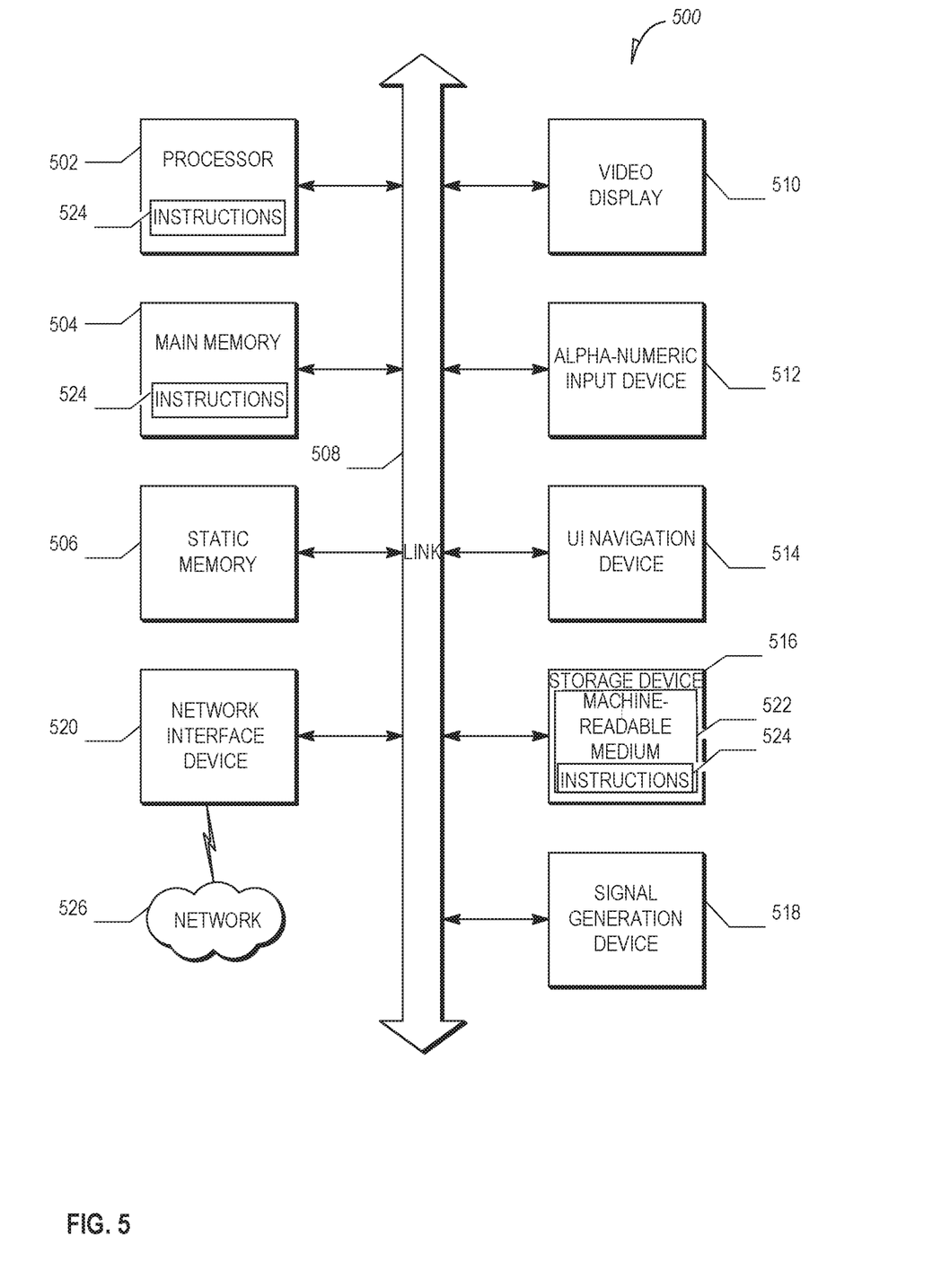
FIG. 5 is a block diagram illustrating an example machine upon which any one or more of the techniques (e.g., methodologies) discussed herein may be performed, according to an example embodiment.

FIG. 5 is a block diagram illustrating a machine in the example form of a computer system 500, within which a set or sequence of instructions may be executed to cause the machine to perform any one of the methodologies discussed herein; according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UT navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., 5G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
   receiving, from a merchant server, an application programming interface (API) call including an authorization request for payment when the merchant server receives a transaction request and a mobile wallet identification stored at the merchant server prior to receiving the transaction request;
   querying a database with the mobile wallet identification to determine a logical location of a mobile wallet associated with the mobile wallet identification;
   transmitting, based on the determination, a request for a payment source for the payment to the mobile wallet;
   receiving, from the mobile wallet, an identification of a payment source;
   forwarding the identification of the payment source to the merchant server;
   receiving confirmation from the merchant server that the payment was successful; and
   in response to the confirmation, transmitting a notification to the mobile wallet of the confirmation.

2. The method of claim 1, further comprising:
   updating a balance of the payment source; and
   transmitting a notification of the updated balance to the mobile wallet.

3. The method of claim 1, where transmitting the request for a payment source for the payment to the mobile wallet includes transmitting an amount of the payment.

4. The method of claim 1, further comprising:
   receiving, from the merchant server, a second application programming interface (API) call including a second authorization request for payment and a second mobile wallet identification;
   querying a database with the second mobile wallet identification to determine a logical location of a second mobile wallet associated with the second mobile wallet identification;
   transmitting a request for a payment source for the payment to the logical location of the mobile wallet; and
   receiving a rejection response from the mobile wallet in response to the request for a payment source.

5. The method of claim 4, wherein the rejection is forwarded to the merchant server.

6. A non-transitory computer-readable medium, comprising instructions, which when executed by at least one processor, configure the at least one processor to perform operations comprising:
   receiving, from a merchant server, an application programming interface (API) call including an authorization request for payment when the merchant server receives a transaction request and a mobile wallet identification stored at the merchant server prior to receiving the transaction request;
   querying a database with the mobile wallet identification to determine a logical location of a mobile wallet associated with the mobile wallet identification;
   transmitting, based on the determination, a request for a payment source for the payment to the mobile wallet;
   receiving, from the mobile wallet, an identification of a payment source;
   forwarding the identification of the payment source to the merchant server;
   receiving confirmation from the merchant server that the payment was successful; and
   in response to the confirmation, transmitting a notification to the mobile wallet of the confirmation.

7. The computer-readable medium of claim 6, wherein the operations further comprise:
   updating a balance of the payment source; and
   transmitting a notification of the updated balance to the mobile wallet.

8. The computer-readable medium of claim 6, where transmitting the request for a payment source for the payment to the mobile wallet includes transmitting an amount of the payment.

9. The computer-readable medium of claim 6, wherein the operations further comprise:
   receiving, from the merchant server, a second application programming interface (API) call including a second authorization request for payment and a second mobile wallet identification;
   querying a database with the second mobile wallet identification to determine a logical location of a second mobile wallet associated with the second mobile wallet identification;
   transmitting a request for a payment source for the payment to the logical location of the mobile wallet; and
   receiving a rejection response from the mobile wallet in response to the request for a payment source.

10. The computer-readable medium of claim 9, wherein the rejection is forwarded to the merchant server.

11. A system comprising:
    at least one processor; and
    at least one storage device comprising instructions, which when executed by the at least one processor, configure to at least one processor to:
    perform operations comprising:
    receiving, from a merchant server, an application programming interface (API) call including an authorization request for payment when the merchant server receives a transaction request and a mobile wallet identification stored at the merchant server prior to receiving the transaction request;
    querying a database with the mobile wallet identification to determine a logical location of a mobile wallet associated with the mobile wallet identification;
    transmitting, based on the determination, a request for a payment source for the payment to the mobile wallet;
    receiving, from the mobile wallet, an identification of a payment source;
    forwarding the identification of the payment source to the merchant server;
    receiving confirmation from the merchant server that the payment was successful; and
    in response to the confirmation, transmitting a notification to the mobile wallet of the confirmation.

12. The system of claim 11, wherein the at least one processor is further configured to perform operations comprising:
  updating a balance of the payment source; and
  transmitting a notification of the updated balance to the mobile wallet.

13. The system of claim 11, where transmitting the request for a payment source for the payment to the mobile wallet includes transmitting an amount of the payment.

14. The system of claim 11, wherein the at least one processor is further configured to perform operations comprising
  receiving, from the merchant server, a second application programming interface (API) call including a second authorization request for payment and a second mobile wallet identification;
  querying a database with the second mobile wallet identification to determine a logical location of a second mobile wallet associated with the second mobile wallet identification;
  transmitting a request for a payment source for the payment to the logical location of the mobile wallet; and
  receiving a rejection response from the mobile wallet in response to the request for a payment source.

15. The system of claim 14, wherein the rejection is forwarded to the merchant server.

\* \* \* \* \*